United States Patent
Wang et al.

(10) Patent No.: US 9,595,894 B2
(45) Date of Patent: Mar. 14, 2017

(54) TRIBOELECTRIC NANOGENERATOR FOR POWERING PORTABLE ELECTRONICS

(71) Applicant: Georgia Tech Research Corporation, Atlanta, GA (US)

(72) Inventors: Zhong Lin Wang, Atlanta, GA (US); Sihong Wang, Atlanta, GA (US); Long Lin, Atlanta, GA (US); Guang Zhu, Atlanta, GA (US); Zong-Hong Lin, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 846 days.

(21) Appl. No.: 14/032,864

(22) Filed: Sep. 20, 2013

(65) Prior Publication Data
US 2014/0084748 A1    Mar. 27, 2014

Related U.S. Application Data

(60) Provisional application No. 61/704,138, filed on Sep. 21, 2012, provisional application No. 61/754,992, filed on Jan. 22, 2013.

(51) Int. Cl.
*H02N 11/00*    (2006.01)
*H02N 1/04*    (2006.01)

(52) U.S. Cl.
CPC ............ *H02N 11/002* (2013.01); *H02N 1/04* (2013.01)

(58) Field of Classification Search
CPC .............................. H02N 11/002; H02N 1/04
USPC .................................................. 310/300, 309
See application file for complete search history.

(56) References Cited

U.S. PATENT DOCUMENTS

| | | | |
|---|---|---|---|
| RE29,357 E * | 8/1977 | Bickmore | G03G 5/022 427/256 |
| 4,126,822 A | 11/1978 | Wahlstrom | |
| 4,990,813 A | 2/1991 | Paramo | |
| 2006/0064826 A1 | 3/2006 | Kimball | |
| 2008/0265710 A1 * | 10/2008 | Ikehashi | H02N 1/006 310/309 |

(Continued)

OTHER PUBLICATIONS

Notification of related application: commonly owned U.S. Appl. No. 13/598,132, filed Aug. 29, 2012 by Wang et al. includes matter that may be related to the present invention.

*Primary Examiner* — Terrance Kenerly
(74) *Attorney, Agent, or Firm* — Bryan W. Bockhop; Bockhop Intellectual Property Law, LLC

(57) ABSTRACT

A triboelectric generator includes a first contact charging member and a second contact charging member. The first contact charging member includes a first contact layer and a conductive electrode layer. The first contact layer includes a material that has a triboelectric series rating indicating a propensity to gain electrons due to a contacting event. The conductive electrode layer is disposed along the back side of the contact layer. The second contact charging member is spaced apart from and disposed oppositely from the first contact charging member. It includes an electrically conductive material layer that has a triboelectric series rating indicating a propensity to lose electrons when contacted by the first contact layer during the contacting event. The electrically conductive material acts as an electrode. A mechanism maintains a space between the first contact charging member and the second contact charging member except when a force is applied thereto.

14 Claims, 3 Drawing Sheets

(56) References Cited

U.S. PATENT DOCUMENTS

| | | |
|---|---|---|
| 2010/0133006 A1 | 6/2010 | Shakra et al. |
| 2011/0050181 A1 | 3/2011 | Post et al. |
| 2011/0135836 A1* | 6/2011 | Hays ................ H01M 4/04 427/475 |
| 2011/0148248 A1* | 6/2011 | Landa ................ H01J 45/00 310/306 |

* cited by examiner

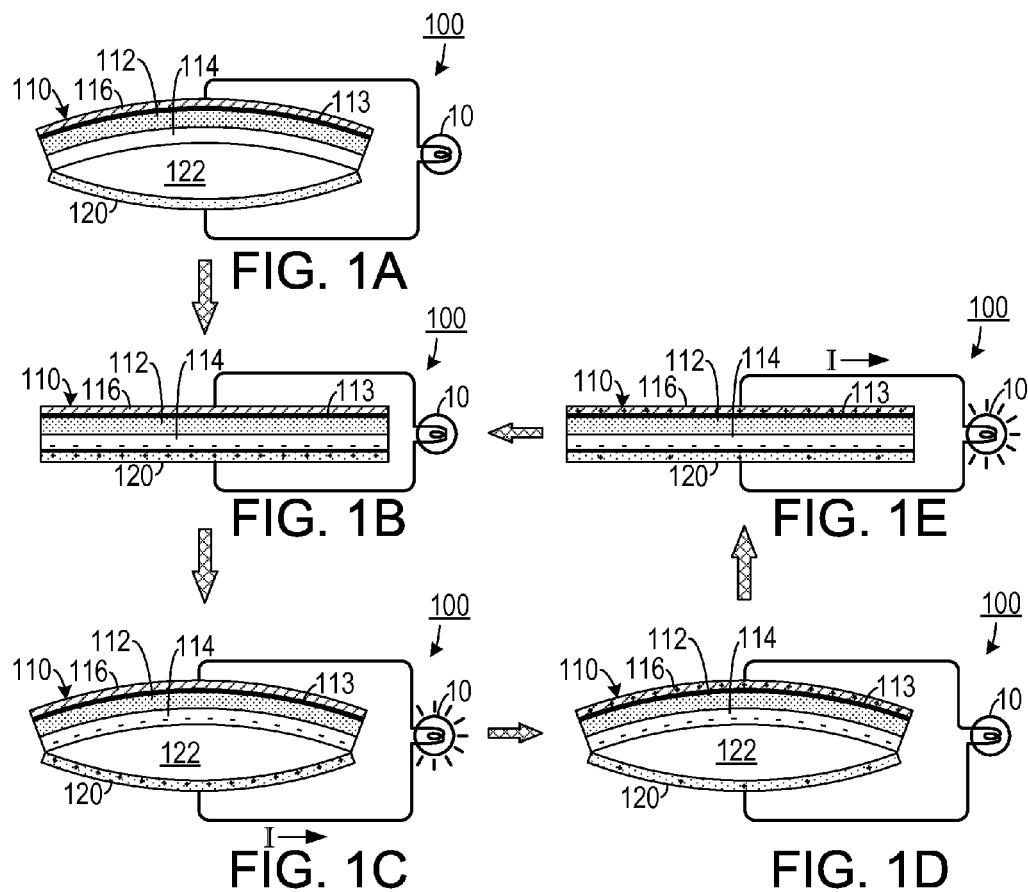
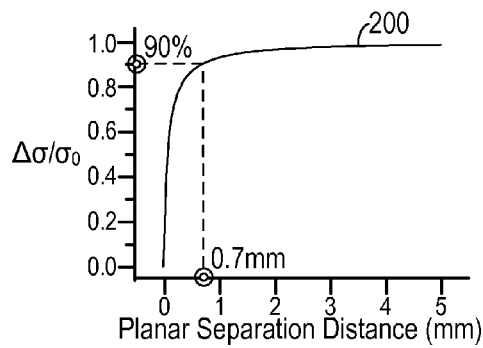

TRIBOELECTRIC NANOGENERATOR FOR POWERING PORTABLE ELECTRONICS

CROSS-REFERENCE TO RELATED APPLICATION(S)

This application claims the benefit of U.S. Provisional Patent Application Ser. No. 61/704,138, filed Sep. 21, 2012, and U.S. Provisional Patent Application Ser. No. 61/754,992, filed Jan. 22, 2013, the entirety of each of which is hereby incorporated herein by reference.

STATEMENT OF GOVERNMENT INTEREST

This invention was made with government support under agreement No. DE-FG02-07ER46394, awarded by the Department of Energy and under agreement No. CMMI-0946418, awarded by the National Science Foundation. The government has certain rights in the invention.

BACKGROUND OF THE INVENTION

1. Field of the Invention

The present invention relates to electric power generators and, more specifically, to generators that derive power from mechanical contact between surfaces.

2. Description of the Related Art

Wireless, portable and multi-function electronic devices require independent and maintenance-free power sources. The emerging technologies for mechanical energy harvesting are effective and promising approaches for building self-powered systems, because of a great abundance of mechanical energy existing in the environment and the human body. Piezoelectric nanogenerators have been developed to convert tiny-scale mechanical energy into electricity. Another approach to providing power is though triboelectric nanogenerators based on the contact-electrification effect. Triboelectric nanogenerators harvest mechanical energy through a periodic contact and separation of two polymer plates. However, most triboelectric nanogenerators have limited power output.

Therefore, there is a need for triboelectric nanogenerators with increased power output.

SUMMARY OF THE INVENTION

The disadvantages of the prior art are overcome by the present invention which, in one aspect, is a triboelectric generator that includes a first contact charging member and a second contact charging member. The first contact charging member includes a first contact layer and a conductive electrode layer. The first contact layer has a contact side and an opposite back side. The first contact layer includes a material that has a triboelectric series rating indicating a propensity to exchange electrons due to a contacting event. The conductive electrode layer is disposed along the back side of the contact layer. The second contact charging member is spaced apart from and disposed oppositely from the first contact charging member. The second contact charging member includes an electrically conductive material layer that has a triboelectric series rating indicating a propensity to exchange electrons when contacted by the first contact layer during the contacting event. The electrically conductive material layer is configured to act as an electrode. A mechanism is configured to maintain a space between the first contact charging member and the second contact charging member except when a force is applied thereto.

In another aspect, the invention is a triboelectric generating device that includes a first contact charging member and a second contact charging member. The first contact charging member includes a substrate layer having a first side and a second side, a first contact layer and a conductive electrode layer. The substrate layer is configured to maintain a concave shape unless a force is applied thereto. The first contact layer has a contact side and is affixed to the first side of the substrate layer. The first contact layer includes a material that has a triboelectric series rating indicating a propensity to gain electrons due to a contacting event. The conductive electrode layer is affixed to the second side of the substrate layer. The second contact charging member is spaced apart from and disposed oppositely from the first contact charging member. The second contact charging member includes an electrically conductive metal layer that has a triboelectric series rating indicating a propensity to lose electrons when contacted by the first contact layer. The second contact charging member defines a concave shape that is reflective of the concave shape of the substrate layer.

In yet another aspect, the invention is a triboelectric generating system that includes a first contact charging member, a second contact charging member and at least one spring. The first contact charging member, the first contact charging member includes a first rigid substrate, a conductive electrode layer disposed on the substrate and a first contact layer. The first contact layer is disposed on the conductive electrode layer and includes a material that has a triboelectric series rating indicating a propensity to gain electrons due to a contacting event. The second contact charging member is spaced apart from and disposed oppositely from the first contact charging member, and includes a second rigid substrate and an electrically conductive material layer. The electrically conductive material layer has a triboelectric series rating indicating a propensity to lose electrons when contacted by the first contact layer disposed on the second rigid substrate. The spring is configured to maintain space between the first contact charging member and the second contact charging member except when a force is applied thereto.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1A-E are a series of schematic views showing operation of a first embodiment of a triboelectric generator.

FIG. 2 is a graph relating charge density to separation distance.

DETAILED DESCRIPTION OF THE INVENTION

Figure 3:
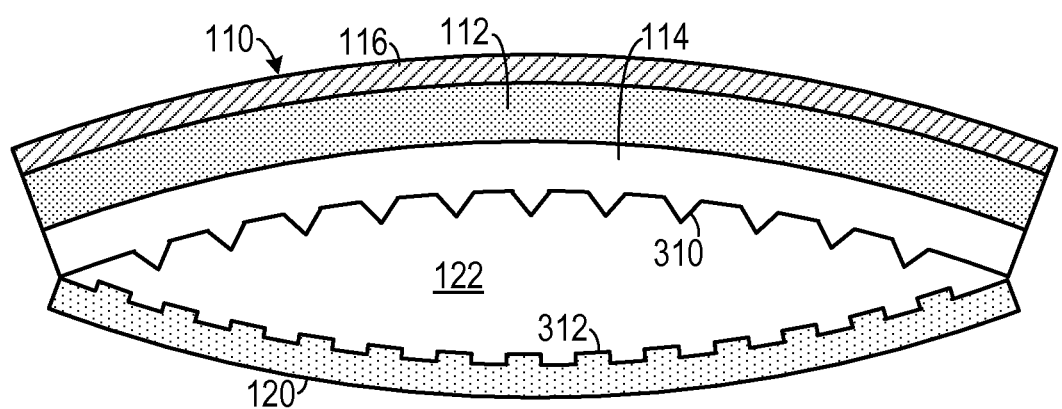
FIG. 3 is a schematic view showing a triboelectric generator with patterned surfaces.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 13/598,132, filed on Aug. 29, 2012 by Wang et al. discloses methods of making triboelectric generators and components thereof and is incorporated herein by reference for the purpose of disclosing such methods.

As shown in FIG. 1A, one embodiment of a triboelectric generator 100 includes a first contact charging member 110 that has a first substrate material layer 112, which could include poly(4,4'-oxydiphenylene-pyromellitimide) (which is sold under the trademark "Kapton"), adjacent to a second substrate material layer 113, which can include a material such as $SiO_2$. The first contact charging member 110 also includes a first contact layer 114, which could include, for example, PDMS, PTFE, FEP, PVC, and a Polyimide, or any material that has a triboelectric series rating indicating a propensity to gain electrons due to a contacting event. The first substrate material layer 112 and the second substrate material layer 113 are applied to each other at an elevated temperature and then cooled so that differential shrinkage during cooling causes the contact charging member to have a concave shape. The first substrate material layer 112 can include a polymer sheet having a first thermal expansion coefficient and the second substrate material layer 113 can include a ceramic film having a second thermal expansion coefficient that is less than the first thermal expansion coefficient. A second contact charging member 120 includes an electrically conductive metal layer (which could include a material such as aluminum, a metal or a conductive polymer) that has a triboelectric series rating indicating a propensity to lose electrons when contacted by the first contact layer 114. The second contact charging member 120 defines a concave shape that is reflective of the concave shape of the substrate layer so that when the second contact charging member 120 is placed adjacent to the first contact layer 114, the two layers define a space 122 therebetween unless a force is applied to the layer to bring them together. A first conductive electrode 116, which is applied to the second substrate material layer 113, and the second contact charging member 120, which acts as an electrode as a result of its conductivity, can be coupled to a load 10 to apply current thereto.

As shown in FIGS. 1B-1E, triboelectric nanogenerator 100 generates current by applying a cycled compressive force onto the whole area of the device, so that the bending plates will be periodically pressed to flatten and contact closely with each other, as shown in FIG. 1B. Once released, as shown in FIG. 1C, the two plates will separate apart due to the stored elastic energy and revert instantaneously back to their original arch shape due to resilience. A cycled generation of the potential difference between the two electrodes 112 and 120 drives the flow of electrons through the load 10. At the original state before the contact of the triboelectric films (as shown in FIG. 1A), there is no charge transferred, thus no electric potential. Upon the pressing of the two films towards each other, they will be brought fully into surface contact (as shown in FIG. 1B) and possibly relative sliding would occur, which results in electrons being transferred from a material in the positive side of the triboelectric series to the one in the negative side in the series. Accordingly, electrons will be injected from the aluminum surface 120 to PDMS surface 114, leaving positive charges on aluminum foil 120. The positive triboelectric charges on the conductive aluminum foil 120 attract the electrons in the opposite electrode to flow through the external load 10. After cycles of deformation, when the device is press and the surfaces with charges are in close contact with each other, all of the triboelectric charges will stay on the inner surfaces with the same surface density ($\sigma 0$). Once the pressing force is released, the triboelectric nanogenerator 100 will immediately rebound back to its original arch shape due to the elasticity of the film so that a gap 122 will form again between the two plates, as shown in FIG. 1C. The electric field generated by the separated surface charges will then give rise to a much higher potential on the aluminum foil side 120 than the top electrode 116. Such a potential difference will drive the flow of positive charges from aluminum foil to the top electrode through the external load 10 until the potential difference is fully offset by the transferred charges, rendering the top electrode with a surface charge density of ($\Delta\sigma$), while the aluminum electrode 120 is left with ($\sigma 0 - \Delta\sigma$), as shown in FIG. 1D. Subsequently, when the triboelectric nanogenerator is pressed again to reach the close contact of the two plates, as shown in FIG. 1E, these redistributed charges will inversely build a positive potential on the top electrode 116, which will drive all of the transferred charges ($\Delta\sigma$) to flow back to the inner surface of the aluminum foil 120. Then a cycle is achieved and the device will go back to the equilibrium state depicted in FIG. 1B.

Both the voltage and current outputs are related to the amount of charges transferred ($A\Delta\sigma$, A is surface area of the plate), which is determined by the triboelectric charge density ($\sigma 0$) and the separation distance of the two plates. The results of an analytical calculation 200 based on a simplified model of quasi-infinite flat plates, indicates the magnitude of the distance required for the optimum output, as shown in FIG. 2. When the separation distance starts to increase from 0 to 0.7 mm, $\Delta\sigma$ keeps a very rapid increase from 0 to ~90% of $\sigma 0$. Then, the slope of this curve starts to decrease. Thus, both an intimate contact and a subsequent separation of nearly 1 mm result in the phenomenal transferring of charges.

In one experimental embodiment, the electric output measurement was performed on an arch-shaped triboelectric nanogenerator device in a size of 3 cm×2.8 cm, with the triggering frequency of 6 Hz and controlled amplitude. Since the accumulation of the triboelectric charges increases and reaches equilibrium in a certain period of time after multiple cycles, the output will gradually go up in the first stage upon deformation. Then, the open-circuit voltage (VOC) will stabilize at 230 V, measured by an electrometer with infinite input resistance. When the bottom Al is connected to the positive probe of the electrometer, upon the release of the pressing force a positive voltage is generated because of the immediate charge separation. Since the electrons cannot flow in an open-circuit condition, the voltage will hold at a plateau unless there is a quick leakage.

The peak value of the short-circuit current (ISC) reaches 94 µA, corresponding to the half cycle of pressing that is in higher straining rate than releasing. The integration of the each current peak gives the total charges transferred in a half cycle of deformation. Moreover, when the connection polarity to the electrometer is switched, both the voltage and current signal will be completely reversed. The gap from the arch-shaped structure is an important factor for the enhanced output, because without the SiO2-film-introduced bending, there will be much smaller and unstable electrical output.

As shown in FIG. 3, the triboelectric effect can be enhanced by using texture patterned surfaces on the first contact layer 114 and the second contact layer 120. For example the surfaces can employ an array of pyramid structures 310 or an array of box-like structures 312, or a combination of these structures or one of many other shaped structures formed in the surfaces.

Fabricating one experimental embodiment began with photolithographic patterning of 4 in. (100) Si wafers with thermally grown $SiO_2$ on top. The patterned wafer with the array of square window openings was firstly etched by buffered-oxide-etching process to transfer the pattern onto the $SiO_2$ layer. Then, the wafer was etched in KOH solution to fabricate the recessed features of pyramid. After cleaned with acetone, isopropanol and ethanol in sequence, the Si molds were treated with trimethylchlorosilane (Sigma Aldrich) by gas phase silanization to enable the easy peel-off of the PDMS film from the Si mold in the following step. In preparing the patterned PDMS film, the elastomer and the cross-linker (Sylgard 184, Dow Corning) were mixed in a 10:1 ratio (w/w), and then casted on the Si mold. After the degassing process under the vacuum, the mixture was spin-coated on the Si mold at 500 rpm for 60 s. After the thermally curing process at 85° C. for 1 hour, the PDMS inked with pyramid patterns was peeled off from Si mold. The surface without patterns were glued to the inner surface of the bending Kapton substrate.

The triboelectric nanogenerator can be integrated with a battery, such as a lithium ion battery. In assembling such an embodiment, two different slurries for the two working electrodes were made, which contain 70 wt % active material ($LiCoO_2$ for cathode and graphite for anode), 10 wt % carbon black powders as conductor, 20 wt % polyvinylidene fluoride (PVDF) binder and N-methyl-2-pyrrolidone (Sigma Aldrich) as the solvent. Then the slurries were cast onto the current collectors (Al foil for cathode and Cu foil for anode) respectively with a uniform thickness of 10 µm. The electrodes were baked at 110° C. under vacuum for 12 hours. Stainless-steel coin cells were used for the battery assembly. The cathode and anode electrodes were stacked with a piece of polyethylene (PE) separator (MTI Corporation) in between. After the system was filled with electrolyte (1M LiPF6 in 1:1:1 ethylene carbonate:dimethyl carbonate:diethyl carbonate, Novolyte Technologies), the coin-cell was finally sealed.

In another embodiment of a triboelectric nanogenerator 400, as shown in FIGS. 4A-4D, the first contact charging member 410 includes a first rigid substrate 412 to which a conductive electrode layer 414 is applied. The first rigid substrate 412 can include a material such as polymethyl methacrylate (PMMA). The conductive electrode layer 414 can include, for example, a material such as gold, a metal, ITO, or a conducting polymer. A first contact layer 416 is applied to the conductive electrode layer 414. The first contact layer 416 is made from a material that has a triboelectric series rating indicating a propensity to gain electrons due to a contacting event, such as, for example, PDMS, PTFE, FEP, PVC, or a polyimide. A second contact charging member 420 includes a second rigid substrate 422, which can include can include a material such as polymethyl methacrylate (PMMA). An electrically conductive material layer 423 is applied to the second rigid substrate 422. Electrically conductive material layer 423 has a triboelectric series rating indicating a propensity to lose electrons when contacted by the first contact layer 416. In one representative embodiment, the electrically conductive material layer 423 includes a gold film 424 and a plurality of gold nanoparticles 426 disposed thereon. One or more springs 430 maintain a space 432 between the first contact charging member 410 and the second contact charging member 420 except when a force is applied thereto. The springs 430 may be held in place by receptacles 434 defined by the rigid substrates 412 and 422.

Figure 4A:
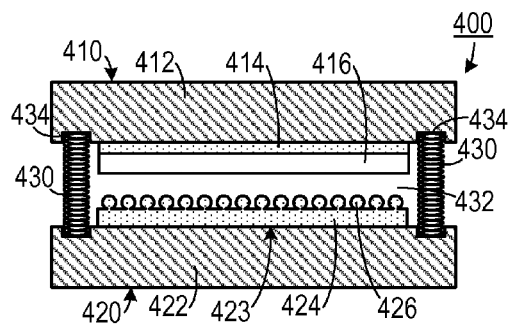
FIG. 4A is a schematic side view of a second embodiment of a triboelectric generator.
Figure 4B:
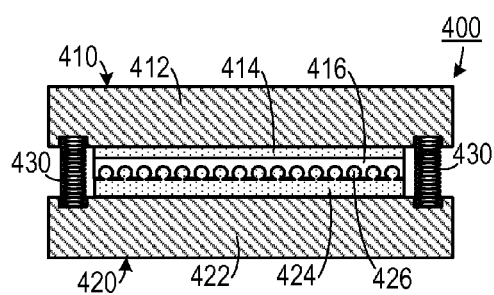
FIG. 4B is a schematic side view of the embodiment shown in FIG. 4A when compressed by an activating force.
Figure 4C:
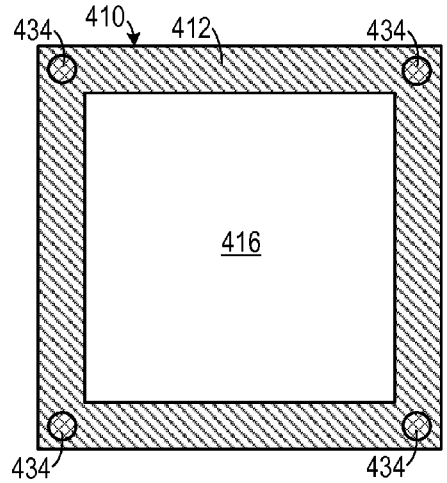
FIG. 4C is a schematic plan view of a first contact charging member employed in the embodiment shown in FIG. 4A.
Figure 4D:
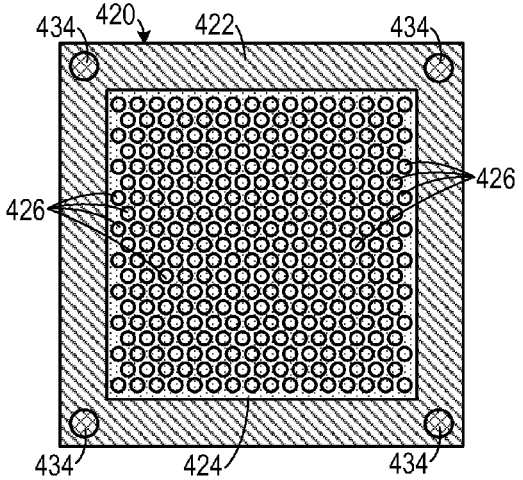
FIG. 4D is a schematic plan view of a second contact charging member employed in the embodiment shown in FIG. 4A.

Compression of the first contact charging member 410 and the second contact charging member 420 is shown in FIG. 4B. The use of nanoparticles 426 increases the contact are substantially, increasing the triboelectric effect. This embodiment of a triboelectric nanogenerator 400 offers a substantially higher power output due nanoparticle 426-based surface modification. In one experimental embodiment, short-circuit current reached a peak value of 2.0 mA, which corresponded to the instantaneous power output of 1.2 W and power density of 322.7 W/m$^2$. Average power output and energy conversion efficiency at device level was calculated to be 132 mW and 9.8%, respectively. This embodiment also realized scaling up of nanogenerator power output, making it power not just a single electronic device but hundreds of them simultaneously. Triggered by a commonly available mechanical source such as footfalls, the nanogenerator was capable of instantaneously lighting up 600 commercial LED lamps in real time. This indicates the practicability of harvesting mechanical energy by the nanogenerator on a large scale. The working mechanism demonstrated here can be further applied to potentially harvest large-scale mechanical energy such as from rolling wheels, wind power, and ocean waves.

In one experimental embodiment, the nanogenerator has a layered structure with two substrates. Polymethyl methacrylate (PMMA) was selected as the material for substrates due to its decent strength, light weight, easy processing, and low cost. On the lower side, a layer of contact electrode is prepared. The contact electrode plays dual roles of electrode and contact surface. It consists of a gold thin film and gold nanoparticles coated on the surface. Alternatively, nanoparticles of non-precious metals can also be used as replacements. They modify the surface both physically and chemically. On the other side, a thin film of gold is laminated between the substrate and a layer of polydimethylsiloxan (PDMS). This electrode is referred to as the "back electrode" for later reference. The two substrates are connected by four springs installed at the corners, leaving a narrow spacing between the contact electrode and the PDMS.

The electric energy generation process can be explained by the coupling between triboelectric effect and electrostatic effect. At the original position, a separation distance is maintained by springs. When an external impact is applied onto one of the substrates, the gold and PDMS are brought into contact. According to the triboelectric series that ranks materials' tendency to gain or lose electrons, electrons are injected from gold into PDMS, resulting in surface triboelectric charges, which are retained on the PDMS. As the impact is withdrawn, the contacting surfaces move apart due to restoring force from the springs. Once a separation forms, the back electrode possess a higher electric potential than the contact electrode, producing an electric potential difference. Such a potential difference drives electrons through external loads and screens the positive triboelectric charges on the contact electrode. When the nanogenerator reverts back to the original position, positive triboelectric charges on the contact electrode are completely screened, leaving equal amount of inductive charges on the back electrode. Subsequently, mechanical impact once again shortens the separation, producing an electric potential difference with reversed polarity. In consequence, electrons flow in a reversed direction. They keep screening inductive charges on the back electrode until a direct contact is again established. The insulating PDMS allows long-time retention of the triboelectric charges on its surface even through the triboelectric charges on the metal side are periodically screened by inductive charges. In this process, the nanogenerator acts as an electron pump that drives electrons back and forth between the two electrodes.

The nanogenerator's electric output is strongly related to the contacting force, yielding higher output with larger force. At a force as small as 10 N, the nanogenerator can still produce $I_{sc}$ ranging from 160 µA to 175 µA. When the force increases to 500 N, the electric output reaches a saturated value, producing a peak $I_{sc}$ of 1.2 mA. This result is due to increased contact area with larger force. The two contacting surfaces are neither absolutely flat nor smooth. Surface roughness may be caused by inherent curvature of the substrates, nanoparticle modification, and fabrication defects such as particle contamination from the air. At small contacting force, the surface roughness prevents fully intimate contact between the contact electrode and the PDMS, leaving some areas untouched. With increased force, due to elastic property, the PDMS can deform and fill more vacant space, thus leading to larger contact area. As a result, the electric output increases until all the vacant space is completely filled by the PDMS, reaching a saturated limit.

As an important figure of merit, energy conversion efficiency of the nanogenerator was calculated. The conversion efficiency is defined as the ratio between the electric energy that is delivered to load by the nanogenerator and the mechanical energy the nanogenerator possesses. FIG. 4a is a current pulse output produced by human footfall at load resistance of 1 MΩ. The time span between $t_1$ and $t_2$ represents a single contact. With an external load of pure resistance, the electric energy delivered by the nanogenerator is equal to the Joule heating energy, which is presented below.

$$E_{electric} = Q = \int_{t_1}^{t_2} I^2 \cdot R \cdot dt = R \int_{t_1}^{t_2} I^2 \cdot dt = 1 \times 10^6 (\Omega) \cdot \int_{22.7144}^{22.7200} I^2 \cdot dt = 0.74 \text{ mJ} \quad (1)$$

where Q is the Joule heating energy, I is the instantaneous current, and R is the load resistance. Consequently, the average power output ($W_{average}$) can be obtained by $$W_{average} = \frac{E_{eletric}}{t_2 - t_1} = \frac{0.74 \text{ mJ}}{(22.7200 - 22.7144)s} = 132.1 \text{ mW}$$

As soon as the mechanical energy is introduced, it presents in two forms, i.e. elastic energy stored in the springs and kinetic energy carried by a moveable substrate of the nanogenerator. The elastic energy is later released without converting into electric energy, which is calculated by $$E_{elastic} = \frac{1}{2} \cdot k \cdot x^2 \cdot N = 2.56 \text{ mJ} \quad (2)$$

where k is the spring constant (k=1278.88 N/m), x is the displacement of a spring that is equal to the spacing between the two contacting surfaces (x=1 mm), and N is the number of springs (N=4).

For kinetic energy, at the moment when the two substrates make a contact, it completely transforms to other forms, including electric energy and thermal energy. It can be calculated by the following equation.

$$E_{kinetic} = \frac{1}{2} \cdot m \cdot v^2 = 4.97 \text{ mJ} \quad (3)$$

where m is the mass of the moveable substrate (m=13.45 g, the mass of gold thin film and PDMS layer are negligible), and the v is the velocity of the substrate when a contact is just about to be made (v=0.86 m/s).

Therefore, the energy conversion efficiency (η) is calculated as $$\eta = \frac{E_{electric}}{E_{mechanical}} \times 100\% = \frac{E_{eletric}}{E_{elastic} + E_{kinetic}} \times 100\% = \frac{0.74 \text{ mJ}}{2.56 \text{ mJ} + 4.97 \text{ mJ}} = 9.8\% \quad (4)$$

It is to be noted that the above result is the overall efficiency at device level. However, at conversion process level, the elastic energy stored in the springs does not participate in energy conversion. Therefore if we solely take into account the kinetic energy that actually partially converts to electric energy, the direct efficiency at conversion process level is $$\eta_{direct} = \frac{E_{eletric}}{E_{kinetic}} \times 100\% = \frac{0.74 \text{ mJ}}{4.97 \text{ mJ}} \times 100\% = 14.9\% \quad (5)$$

The unprecedentedly high power output of the nanogenerator is mainly attributed to three factors. Firstly, the contact electrode plays dual roles of electrode and contacting surface. Compared to previously reported designs in which both of the contacting surfaces are made of polymers, more inductive charges will be generated for the new design. Secondly, the elastic property of PDMS enables conformal contact despite of surface roughness. The PDMS can easily deform in response to small pressure and fill the otherwise vacant space that result from substrate curvature and fabrication defects. The tolerance on surface roughness ensures as much contact area as it can be possibly obtained. Also, the surface modification by gold nanoparticles plays an important role for the output enhancement. It can offer five-fold increase on the current output compared to the device without modification. Physically, the bumpy surface of the nanoparticle provides a larger contact area than a flat surface does. Chemically, the as-synthesized gold nanoparticles are positively charged in nature. The pre-carried positive charges may be able to add up with triboelectric charges upon contact, leading to a largely enhanced surface charge density and thus a substantially higher electric output.

In one experimental embodiment, the following fabrication methods were employed.

Materials: Hexadecyltrimethylammonium bromide (≥99%) was purchased from Sigma. Sodium tetrachloroaurate dihydrate (99%) and 1,4-Benzenedithiol (99%) were purchased from Aldrich. Hydrazine hydrate solution (78-

82%) was purchased from Sigma-Aldrich. Deionized water was obtained using a ultrapure (18.2 MΩ-cm) system.

Synthesis of gold nanoparticles: A solution (50 mL) containing Sodium tetrachloroaurate dihydrate (1 mM) and hexadecyltrimethylammonium bromide (10 mM) was brought to a vigorous boil with stirring in a round-bottom flask fitted with a reflux condenser; Hydrazine hydrate solution (20 μL) was then added rapidly to the solution. The solution was heated under reflux for another 8 min, during which time its color changed from pale yellow to pale red. The solution was cooled to room temperature while stirring continuously. The average size (56 nm) of the synthesized gold nanoparticles was verified through SEM analysis.

Self-assembly of gold nanoparticles onto Au thin film: Au films were derivatized by immersion in a solution of 1,4-benzenedithiol for 12 h and rinsed with methanol and then water. The derivatized Au films were then immersed in a solution of gold nanoparticles for 12 hours to allow for complete adsorption of a single gold nanoparticle layer. Before the SEM characterization and electrical measurement, non-adsorbed gold nanoparticles were removed by rinsing with water.

Fabrication of the triboelectric nanogenerator: To fabricate the nanogenerator, two pieces of cast acrylic glass were prepared as substrates with dimensions of 3 inch by 3 inch by 3/32 inch. Four half-thorough holes were drilled at corners as houses for spring installation. 50 nm of gold was deposited on both of the substrates by e-beam evaporator (2 inch by 3 inch). On one of the substrates, fluid PDMS that consisted of base and curing agent in a ratio of 5:1 was spin-coated to form a 10 μm-thick layer. Then it was cured at 100° C. for 45 minutes. On the other substrate, gold nanoparticles were uniformly distributed on gold surface by self-assembly. Subsequently, four springs (spring constant=7.3 lb/inch) were installed in the houses to connect the two substrates together, leaving a spacing of 1 mm between the gold and the PDMS. The spacing is required to be substantially larger than the polymer thickness to ensure effective generation of inductive charges. Finally, conducting wires were connected to the two metal layers as leads for subsequent electric measurement or for connection to an external load.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A triboelectric generator, comprising:
   (a) a first contact charging member, including:
      (i) a first contact layer, having a contact side and an opposite back side, including a material that has a triboelectric series rating indicating a propensity to exchange electrons due to a contacting event; and
      (ii) a conductive electrode layer disposed along the back side of the contact layer;
   (b) a second contact charging member, spaced apart from and disposed oppositely from the first contact charging member, including an electrically conductive material layer that has a triboelectric series rating indicating a propensity to exchange electrons when contacted by the first contact layer during the contacting event, the electrically conductive material layer configured to act as an electrode; and
   (c) a mechanism configured to maintain a space between the first contact charging member and the second contact charging member except when a force is applied thereto,
      wherein the first contact charging member has a concave shape, wherein the second contact charging member has a concave shape and wherein the mechanism configured to maintain space comprises the first contact charging member and the second contact charging member being disposed relative to each other so as to define the space therebetween, and wherein the contact charging member includes a first substrate material layer; and a second substrate material layer disposed adjacent to the first substrate material layer, the second substrate material layer applied to the first substrate material layer at an elevated temperature and then cooled so that differential shrinkage during cooling causes the contact charging member to have a concave shape.

2. The triboelectric generator of claim 1, wherein the first contact layer comprises a material selected from a group consisting of: PDMS, PTFE, FEP, PVC, Polyimide and combinations thereof.

3. The triboelectric generator of claim 1, wherein at least one of the first contact layer and the electrically conductive material layer comprises a textured patterned surface.

4. The triboelectric generator of claim 1, wherein the first substrate material layer comprises a polymer sheet having a first thermal expansion coefficient and wherein the second substrate material layer comprises a ceramic film having a second thermal expansion coefficient that is less than the first thermal expansion coefficient.

5. The triboelectric generator of claim 1, wherein the electrically conductive material layer comprises a material selected from a group consisting of: aluminum, a metal, a conductive polymer and combinations thereof.

6. The triboelectric generator of claim 1, wherein the electrically conductive material layer comprises:
   (a) a gold film; and
   (b) a plurality of gold nanoparticles disposed on the gold film.

7. A triboelectric generating device, comprising:
   (a) a first contact charging member, the first contact charging member including:
      (i) a substrate layer having a first side and a second side, the substrate layer configured to maintain a concave shape unless a force is applied thereto, wherein the substrate layer includes: a first substrate material layer; and a second substrate material layer disposed adjacent to the first substrate material layer, the second substrate material layer applied to the first substrate material layer at an elevated temperature and then cooled so that differential shrinkage during cooling causes the contact charging member to have a concave shape;
      (ii) a first contact layer, having a contact side, affixed to the first side of the substrate layer and including a material that has a triboelectric series rating indicating a propensity to gain electrons due to a contacting event; and
      (iii) a conductive electrode layer affixed to the second side of the substrate layer; and
   (b) a second contact charging member, spaced apart from and disposed oppositely from the first contact charging member, including an electrically conductive metal layer that has a triboelectric series rating indicating a propensity to lose electrons when contacted by the first contact layer, the second contact charging member defining a concave shape that is reflective of the concave shape of the substrate layer.

8. The triboelectric generating device of claim 7, wherein the first contact layer comprises a material selected from a group consisting of: PDMS, PTFE, FEP, PVC, Polyimide and combinations thereof.

9. The triboelectric generating device of claim 7, wherein the electrically conductive material layer comprises a material selected from a group consisting of: aluminum, a metal, a conductive polymer and combinations thereof.

10. The triboelectric generating device of claim 7, wherein the first substrate material layer comprises poly(4,4'-oxydiphenylene-pyromellitimide) and wherein the second substrate material layer comprises $SiO_2$.

11. A triboelectric generating system, comprising:
 (a) a first contact charging member, including:
  (i) a first rigid substrate;
  (ii) a conductive electrode layer disposed on the substrate;
  (iii) a first contact layer, disposed on the conductive electrode layer, including a material that has a triboelectric series rating indicating a propensity to gain electrons due to a contacting event; and
 (b) a second contact charging member, spaced apart from and disposed oppositely from the first contact charging member, including:
  (i) a second rigid substrate; and
  (ii) an electrically conductive material layer that has a triboelectric series rating indicating a propensity to lose electrons when contacted by the first contact layer disposed on the second rigid substrate; and
 (c) at least one spring configured to maintain space between the first contact charging member and the second contact charging member except when a force is applied thereto.

12. The triboelectric generating system of claim 11, wherein the first contact layer comprises a material selected from a group consisting of: PDMS, PTFE, FEP, PVC, Polyimide and combinations thereof.

13. The triboelectric generating system of claim 11, wherein the conductive electrode layer comprises a material selected from a group consisting of: gold, a metal, ITO, a conducting polymer, and combinations thereof.

14. The triboelectric generating system of claim 11, wherein the electrically conductive material layer comprises:
 (a) a gold film; and
 (b) a plurality of gold nanoparticles disposed on the gold film.

\* \* \* \* \*